United States Patent [19]

Fini, Jr.

[11] Patent Number: 5,796,225
[45] Date of Patent: Aug. 18, 1998

[54] ELECTRIC VEHICLE POWER CONTROL SYSTEM

[76] Inventor: Anthony W. Fini, Jr., 4273 Mundy St., Blasdell, N.Y. 14219

[21] Appl. No.: 802,915

[22] Filed: Feb. 20, 1997

[51] Int. Cl.$^6$ .............................. H02M 1/08; H02P 5/162
[52] U.S. Cl. .................. 318/139; 388/803; 388/804; 318/251; 318/440; 307/63
[58] Field of Search .......................... 318/138, 139, 318/587, 440, 280–283; 388/803; 363/43; 429/23; 320/6, 18; 307/9–11, 81, 60, 64, 66; 180/274, 65 R

[56] References Cited

U.S. PATENT DOCUMENTS

| | | | |
|---|---|---|---|
| 3,573,582 | 4/1971 | Petrocelli | 318/305 |
| 3,699,413 | 10/1972 | De Sa E Silva et al. | 318/138 |
| 3,718,848 | 2/1973 | Hines | 318/139 |
| 3,728,599 | 4/1973 | Minami | 318/139 |
| 3,917,017 | 11/1975 | Deane | 180/65 R |
| 4,131,833 | 12/1978 | McAuliffe et al. | 318/440 |
| 4,360,766 | 11/1982 | Bogardus, Jr. | 318/139 |
| 4,407,903 | 10/1983 | Gutbier et al. | 439/23 |
| 4,467,407 | 8/1984 | Asano et al. | 363/43 |
| 4,563,621 | 1/1986 | Moore | 318/139 |
| 4,580,081 | 4/1986 | Krueger et al. | 318/139 |
| 5,225,744 | 7/1993 | Ishikawa et al. | 318/139 |
| 5,238,083 | 8/1993 | Horie et al. | 180/274 |
| 5,325,038 | 6/1994 | Banzai et al. | 320/6 |
| 5,352,931 | 10/1994 | Yang | 307/81 |
| 5,455,884 | 10/1995 | Yang | 388/803 |
| 5,498,950 | 3/1996 | Ouwerkerk | 320/18 |

Primary Examiner—Paul Ip

[57] ABSTRACT

The present invention utilizes batteries in series addition and through controlled switching maintains current and voltage more constant as the batteries power a consuming device. The invention is described in its application to an electric motor powered wheeled vehicle and includes sensing means at the vehicles accelerator pedal and computer control to automatically control the power from a battery storage system to the electric motor efficiently and extend longevity of a battery powered vehicle.

13 Claims, 2 Drawing Sheets

ELECTRIC VEHICLE POWER CONTROL SYSTEM

BACKGROUND OF THE INVENTION

Electric motor powered wheeled vehicles are well known in the art and have sparked continued interest as an alternate power source for human transport. One problem in the development of electric vehicles suitable for modern demands is the difficulty of producing a vehicle of reasonable cost, size and performance using current electric power storage systems.

Electric powered vehicles compete with internal combustion powered vehicles as transportation and in view of such must provide a great many of the conveniences of operation found using modern internal combustion vehicles. Thus, it is considered necessary for general acceptance of an electric powered vehicle that it have the ability to operate at reasonable highway speeds, e.g. 50–70 mph, and have a high longevity of operation between down time of charging over average roadway terrain and conditions which might be encountered.

Electric vehicle speeds of 50–70 mph have not been a significant problem to attain, however attaining and maintaining such speeds, for long distances, e.g. distances exceeding about 60 miles over average road terrain has been problematic. In a typical method of powering electric vehicles 6, 8 or 12 volt lead/acid batteries are connected in series in a battery pack to provide a cumulative high voltage output to a speed control device, typically a solid state controller, which regulates the voltage and provides an appropriate current to the electric drive motor.

A problem with such system is that within a short time of operation, the aggregate voltage of the battery pack degrades forcing the current draw from the battery pack to increase to maintain the rate of power consumption of the motor constant. Increasing the current draw increases the degradation of voltage of the batteries within the battery pack, which further increases the rate of consumption of current thus exacerbating the discharge of power stored in the battery pack and substantially limiting the range of operation of the vehicle.

An object of the present invention is to provide a means which maintains the voltage in a battery storage system constant for a longer period of time thereby extending the life of any storage battery system used to power an electric vehicle.

Another object of the present invention is to reduce the weight of the battery storage system.

A still further object of the invention is to decrease the charging time necessary to recharge the battery system.

These and other objects will become apparent from the following recitation of the invention.

SUMMARY OF THE INVENTION

The present invention utilizes a unique controller in arrangement with a plurality of standard voltage batteries to maintain available battery voltage during operation of an electric motor. In a system of the invention, batteries are connected in series in a bank containing a plurality of standard voltage batteries, having an aggregate voltage which exceeds the voltage necessary for enabling a selected electric motor. By progressively increasing or decreasing the aggregate number of battery units which participate in the electrical series connection with the electric motor, the average voltage available to drive the electric motor can be maintained and thus the efficiency of controlled power dissipation.

In a preferred embodiment of the invention, individual batteries in a battery pack comprising a plurality of small capacity, high voltage batteries in series connection, are progressively enabled during operation of the motor to maintain an average available voltage high enough to reduce the effects of voltage degradation and extend the life of the battery pack as compared to a similar battery pack containing a lesser number of higher capacity batteries.

A unique controller operable in the system of the invention, comprises a plurality of separate contact stations arranged for progressive engagement with a base contact, the separate contacts being enabled progressively along a series connection of the output of a bank of batteries. The voltage output of the controller is thus increased by series additon of batteries as the base contact progressively engages the separate contacts.

The system can be computer controlled making it totally automatic in operation and can also be tied into a vehicle's accelerator pedal.

The commonly used potentiometer, referred to as "pot box", can still be utilized with this system or the system can be used alone thereby decreasing cost of any additional motor control.

The smaller batteries, which can be as small as 12-volt heavy duty garden tractor batteries, are about ⅓ the weight and cost of the larger currently used batteries. It has been found that charging 12 of such batteries from an 80 percent depth of discharge is from 1 to 2 hours on normal 110-volt household current.

In a typical operating example of the system, operating a small vehicle weighing at about the 1200–1500 lb. range, 12 small batteries are utilized powering a 72 volt electric motor. The vehicle easily and efficiently operates for about 30 minutes on the first 6 batteries and with the addition of one battery per about 20 minutes of operation, the longevity of operation is substantially increased for a total capability of at least 2½ hours. As can be seen, at 65 mph an operating range of about 200 miles is attainable.

DETAILED DESCRIPTION OF THE INVENTION

Figure 1:
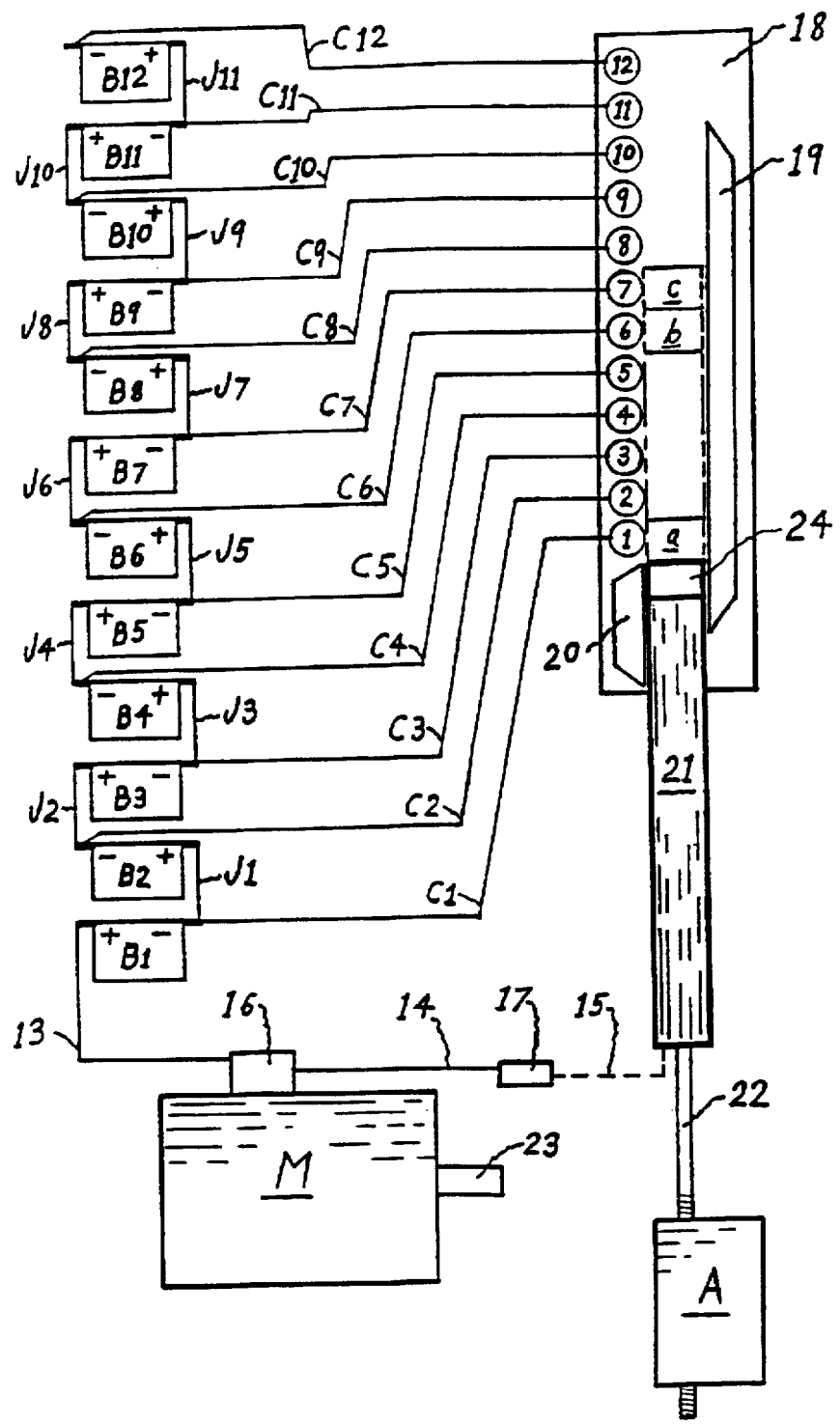
FIG. 1 is a top view of the system showing the electric motor, batteries, forward/reverse switch, control device and wiring. The control device position is shown in the off position, with slow, fast and power maintain positions illustrated in phantom as: a, b and c, respectively.

Beginning with FIG. 1, electric motor M having power output 23 is powered by batteries B1–B12 which are connected in series by electrical jumper conductors J1–J11. Electrical conductor 13 connects battery B1 to a forward/reverse switch 16. Electrical conductor 14 connects the opposite end of switch 16 to a power limit means 17, such as a fuse or the like. Electrical conductor 15, depicted by dotted line, connects the power limit means 17 to the end 24 of plastic slide bar 21 and is flexible in length to allow sufficient travel of the slide bar 21. The slide bar end 24 is made of copper, alluminum or the like and is in electrical conductivity enablement.

Electrical conductors C1–C12 connect the opposite sides of the batteries B1–B12 to respective slide bar contactors 1–12. The contactors 1–12 are made of appropriate electrical conductor material such as copper, aluminum or the like and can be flexibly mounted to a suitably insulated base 18 so as to continuously provide positive contact to slide bar end 24 as the slide bar 21 moves lineally between guides 19 and 20.

Actuator A, through shaft 22, lineally moves the slide bar 21 whose end 24 progressively makes contact with contactors 1–12 thereby increasing the voltage provided by batteries B1–B12 by predetermined measured increments. The actuator A can be manually operated or can be a linear screw-type actuator driven by a low voltage gearmotor. In either case, the voltage is increased by battery addition and decreased by battery subtraction.

In operation of the invention, vehicle direction is chosen by forward/reverse switch 16. When slide bar 21 is moved to position a by actuator A, low power is provided to motor M. As movement of actuator A continues the power delivered to motor M is increased by the series addition of batteries B1–B12 until the desired maximum speed of the vehicle is reached, for example, movement of the slide bar 21 to about position b. Therefore, vehicle speed can be increased or decreased by the movement of actuator A.

If the vehicle is driven for a sustained period of time, the available voltage from position b decreases. For example, the first six batteries B1–B6 combined voltage drops from 72 volts to only 60 volts. The slide bar 21 through actuator A can be moved to include the first seven batteries B1–B7, or position c, thereby returning the available voltage to 72 volts. This procedure can be progressively and incrementally repeated in a timed and/or as needed fashion up to at least about twice the voltage initially necessary by a specific electric motor with current consumption kept at a minimum.

The current limiting means 17 preferrably comprises a circuit breaker and is necessary in the event excess power occurs, through an accidental malfunction, since too much power could damage the electric motor M.

Figure 2:
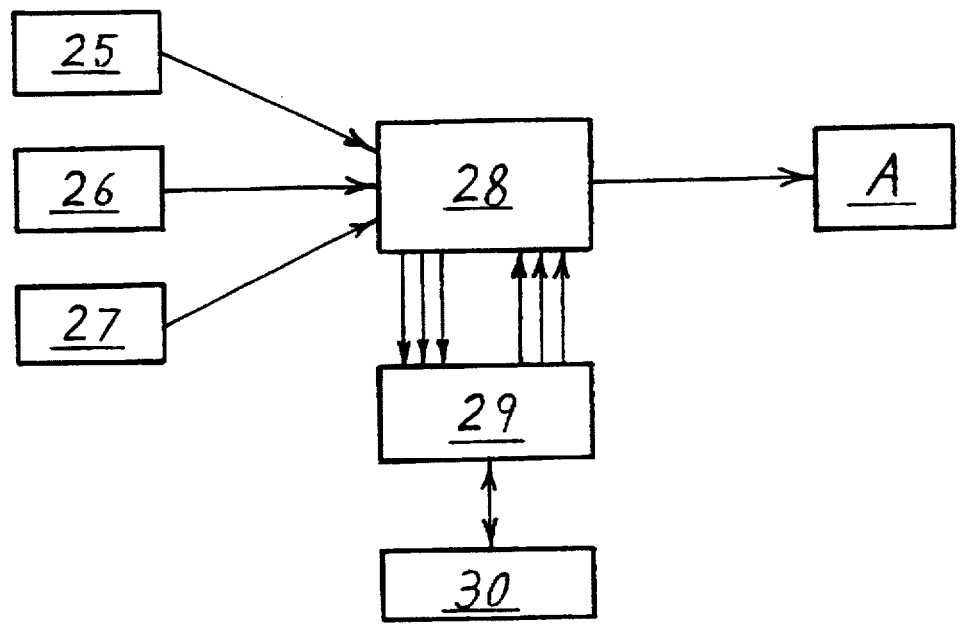
FIG. 2 is a diagrammatic scheme of an embodiment of automatic operation of the arrangement in FIG. 1, responsive to commonly used driver pedal control.

FIG. 2, is a diagrammatic illustration of an automatic computerized system contemplated for cooperatively actuating various components of the system. Therein, sensing means 25 is arranged at the electric motor's output 23 to sense differences in motor speed and sensing means 27 is arranged within the electrical system, preferably between the switch 16 and conductor 14, to sense differences in voltage and/or current imposed upon the system and relays data regarding same to a central processing unit comprising a micro controller data distribution means 28, data storage means 30 and comparitor/computing means 29. Sensing means 26 is arranged at the accelerator pedal of the vehicle and senses reactions of the driver to vehicle performance as manifested by accelerator pedal movement, and relays data regarding same along with data from sensing means 25 and 27 to micro controller data distribution means 28. Micro controller 28 identifies, quantifies and digitizes the data and appropriately distributes same to comparitor 29, along with data from data storage means 30. Comparitor 29, compares the data received from sensing means 25, 26, and 27 in respect to data maintained in data storage 30, analyses, computes and generates data in response which is then sent back to micro controller means 28 for identification, qualification and conversion which is then sent to the gearmotor operated actuator A, in accord with a programmed schedule.

For example, sensing means 25 senses decreased speed at electric motor M and senses a driver reaction at sensor 26, noted through movement of the vehicle's accelerator pedal, seeking increased power to maintain vehicle speed and sensing means 27 senses decreased voltage at the motor M.

The micro controller 28 receives data from sensors 25, 26, and 27, digitizes same to an appropriate format for the central data processing unit and sends the digitized data to the comparitor 29, together with appropriate data stored in data storage 30, where it is analyzed and an appropriate response is computed. The response is then sent to the micro controller 28 where it is identified for appropriate distribution and converted to data which is sent to initiate a response at actuator A. Alternately, sensor 26 senses a driver reaction, through movement of the accelerator pedal, seeking decreased power at the motor M and an appropriate response is computed and initiated at actuator A.

Thus, decreased speed at motor M sensed by sensor 25 and/or decreased voltage sensed by sensor 27 generates data which is compared by comparitor 29 to data received from sensor 26 of a driver response and computed to initiate a programmed schedule to effect an increase or decrease in power automatically with movements of the vehicle's accelerator pedal.

It should be understood that although a preferred embodiment of the invention has been shown and described in detail, many modifications are within contemplation of the invention. For example, it is possible to use any size, type or number of batteries. The voltage increase could be more or less than doubled. The controlling device could be any switching means.

In conclusion, it is contemplated the basic premise of the invention can be extended to areas beyond the automotive field.

I claim:

1. In a vehicle comprising an electric motor enabled by an electrical power storage means containing a plurality of storage battery units each having about equivalent rated voltage output and arranged in series electrical connection, the improvement comprising:

said plurality of battery units arranged in said series comprising an aggregate voltage output which exceeds voltage requirements of said electric motor;

voltage controller means, arranged to enable variable voltage output from said storage means to said electric motor, by progressively increasing or decreasing the aggregate number of battery units participating in electrical series connection to enable said electric motors and means arranged to automatically increase aggregate battery power by adding a battery unit having an actual voltage output about equivalent to the rated voltage output of storage battery units to said participating electrical series connection and coincidentally removing a battery having an actual voltage output below about said rated voltage output from said participating series connection.

2. The electrical power control system of claim 1, wherein said consuming device is an electric vehicle motor.

3. The system of claim 2 comprising switching means arranged to enable forward and reverse electric motor direction.

4. The electrical power control system as specified in claim 2, wherein said motor is rated for operation at 72 volts.

5. The electrical power control system of claim 1, wherein said battery storage means comprises 12 batteries and switching means for said batteries to progressively and incrementally maintain said given current and voltage.

6. An electrical power control system as specified in claim 5, wherein the voltage of a battery is about 12 volts.

7. The electrical power control system of claim 1, wherein said switching means comprises a slide bar which slides lineally thereby connecting and disconnecting said batteries.

8. The electrical power control system as specified in claim 7. wherein said linear switch is operated by a gearmotor driven linear actuator.

9. The electrical power control system of claim 1, wherein a circuit breaker is interconnected between said consuming device and said battery storage means.

10. In combination in an electrical power control system:
   an electrical consuming device;
   a plurality of batteries arranged in series connection to enable said consuming device;
   sensing means arranged to sense variations in storage power of said batteries;
   computer controlled means and switching means arranged to automatically increase battery power by series addition of a battery to said series connection, and coincident removal of a battery from said series connection so that voltage and current to said consuming device is maintained about constant while said consuming device power consumption is about constant.

11. The combination of claim 10 wherein the consuming device comprises an electric motor, said plurality of batteries are arranged to enable said electric motor, sensing means are arranged to sense speed variations of said motor, and means are arranged to automatically increase and decrease aggregate voltage to said motor by series addition and subtraction of one or more batteries to said battery means so that the speed of said motor is increased by the addition of said battery means and decreased by the subtraction of said battery means.

12. The combination comprising:
   a direct current electric motor;
   a plurality of batteries arranged in series connection in enabling circuitry with said electric motor;
   switching means, arranged to progressively add batteries contained in said series connection in enabling circuitry with said electric motor, said switching means comprising a plurality of spaced apart contactors arranged lineally along about a plane and a slidable bar arranged to lineally move progressively along about said plane adjacent said plurality of spaced apart contacts, and comprising a contact enabled to engage a spaced apart contact;
   wherein said contact of said bar, is sized to engage a first spaced apart contact and maintain engagement with said first contact as said bar moves along about said plane and engages a second spaced apart contact, in an arrangement wherein said switching means continually maintains said electric motor in enabling circuitry with said series arrangement of batteries throughout its lineal movement along the plurality of spaced apart contacts.

13. The combination of claim 12 comprising 12 batteries, each comprising a 12 volt rating, an electric motor comprising a maximum 72 volt rating, said switching means comprises a slide bar which connects and disconnects said batteries, and said slide bar is moved lineally by gearmotor means.

* * * * *